United States Patent [19]

Purcupile et al.

[11] 4,008,970
[45] * Feb. 22, 1977

[54] FORCE APPLYING

[75] Inventors: John Charles Purcupile, Monroeville; Martin J. Dempsey, Bethel Park; Selwyn Raymond Rackoff, Pittsburgh, all of Pa.

[73] Assignee: Asko, Inc., West Homestead, Pa.

[ * ] Notice: The portion of the term of this patent subsequent to Feb. 22, 1994, has been disclaimed.

[22] Filed: Nov. 13, 1975

[21] Appl. No.: 631,436

[52] U.S. Cl. ............................ 403/31
[51] Int. Cl.$^2$ ........................ F16D 3/80
[58] Field of Search ............ 72/247, 238, 237; 403/31, 36; 254/27 A; 29/125, 130, 113 R, 119, 123; 74/230.17 F; 279/1 D, 2 A; 85/32 T; 151/14 R; 92/93, 101, 96, 98 R

[56] References Cited
UNITED STATES PATENTS

| | | | |
|---|---|---|---|
| 2,446,694 | 8/1948 | Dickson | 92/93 |
| 3,362,733 | 1/1968 | Klara | 403/31 |
| 3,462,180 | 8/1969 | Bunyan | 403/31 |
| 3,486,776 | 12/1969 | LeBaron | 403/31 |
| 3,613,429 | 10/1971 | Schwarzenberg et al. | 72/249 |
| 3,793,869 | 2/1974 | Hufnagl et al. | 29/125 |

*Primary Examiner*—Milton S. Mehr
*Attorney, Agent, or Firm*—Hymen Diamond

[57] ABSTRACT

An hydraulic nut including an annulus, typically of stainless steel, having an annular cavity therein. The cavity is sealed pressure-tight by an annular deformable membrane of the same material as the annulus which is welded to the annulus about the cavity by a fusion weld. An hydraulic fluid, under pressure, typically grease, is injected into the cavity. The membrane is backed up by an annular shoe and the force produced by the pressure is transmitted through the membrane and the shoe to the object to which the force is applied. Very high forces may be applied by this apparatus.

7 Claims, 11 Drawing Figures

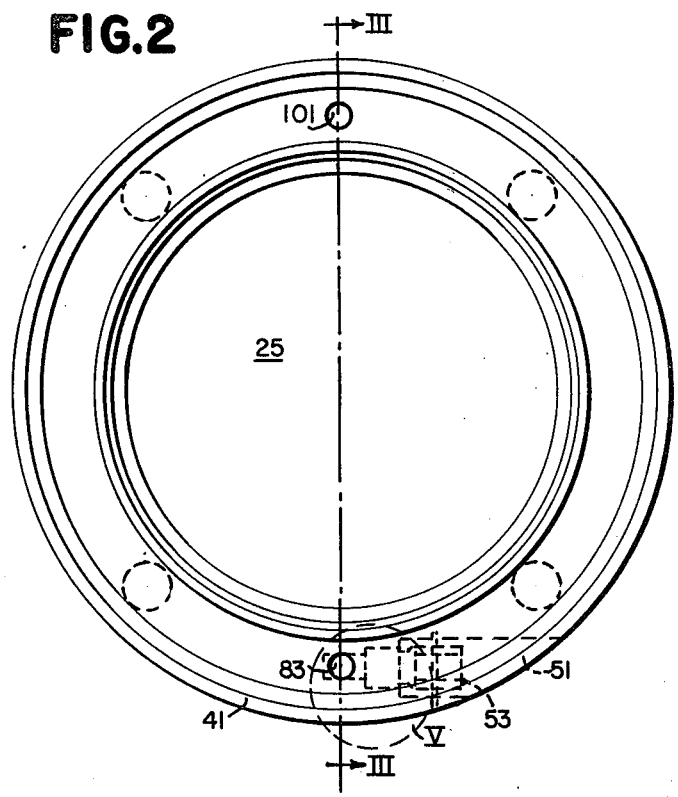
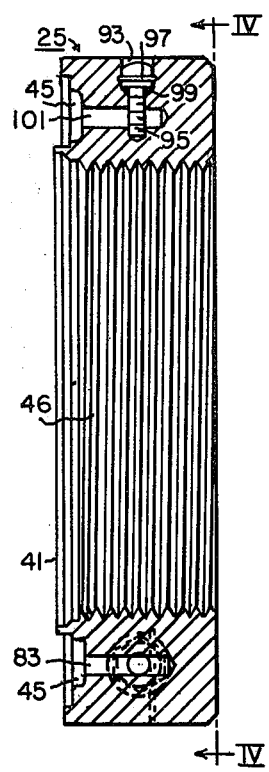
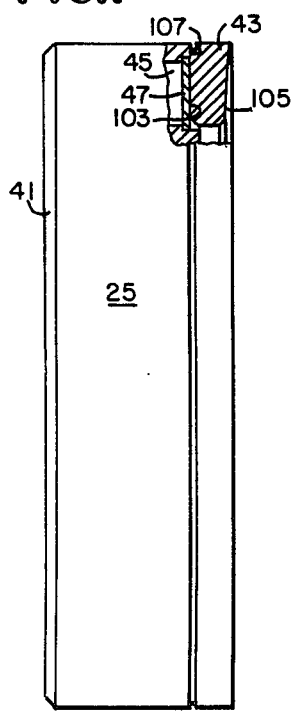
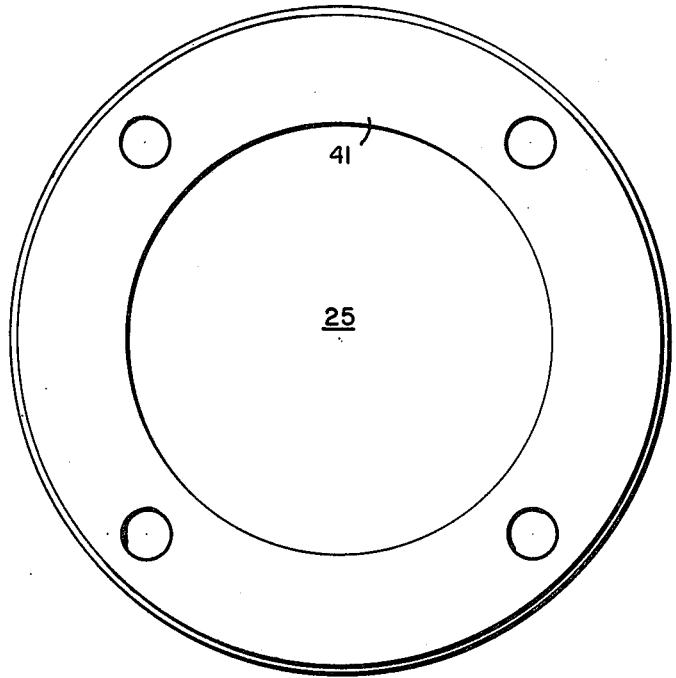

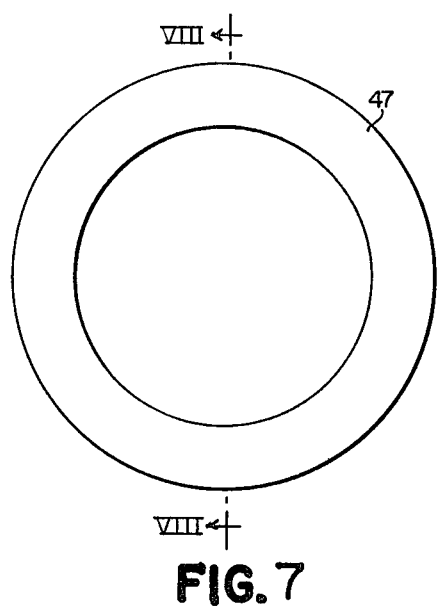
FIG. 7    FIG. 8
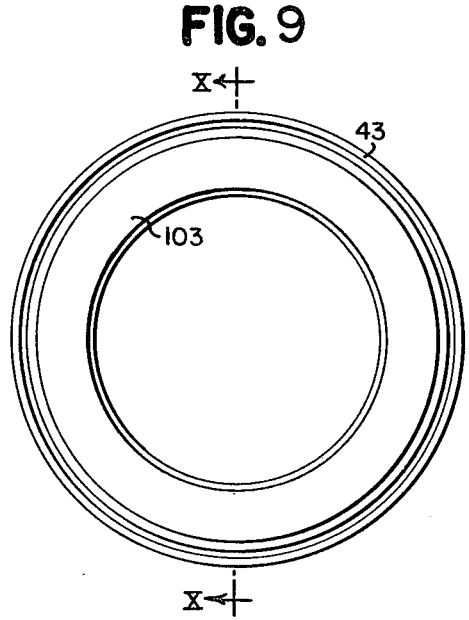
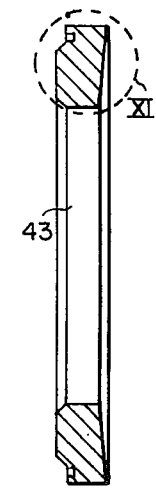
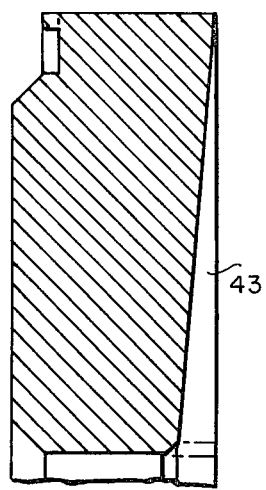
FIG. 9    FIG. 10    FIG. 11

FORCE APPLYING

REFERENCE TO RELATED APPLICATIONS

Application Ser. No. 631,635, filed concurrently with this application, to John Charles Purcupile, Martin J. Dempsey and Selwyn Raymond Rackoff for Work Reducing (herein called Purcupile application) and assigned to ASKO Inc. is incorporated herein by reference.

BACKGROUND OF THE INVENTION

The Purcupile application relates to work reducing in which work-reducing rolls are subjected to high axial force by hydraulic-pressure means to suppress any tendency of the rolls to rotate relative to their arbor. It is an object of this invention to provide apparatus which shall effectively apply this high force, and which while having unique utility as part of work-reducing apparatus including reducing rolls has other uses and purposes.

In accordance with the teachings of the prior art (Hufnagl U.S. Pat. No. 3,793,869 and JETNUT hydraulic nuts sold by Jerry Tools Inc., 6206 Vine Street, Cincinnati, Ohio 45216) apparatus for applying high force hydraulically, specifically an hydraulic nut, is provided in which a piston or pad slideable in an annular cylinder is urged under hydraulic pressure into engagement with the object to which the force is to be applied. Typically the piston is sealed against leakage of the hydraulic fluid by an O-ring of neoprene or the like. This prior-art practice has not proved satisfactory because of the leakage of the hydraulic fluid and the deterioration of the O-ring gasket by the fluid, particularly at high temperature, typically above 200° F to 300° F.

It is an object of this invention to overcome the disadvantages of the prior art and to provide hydraulic pressure applying means without O-rings subjected directly to the hydraulic fluid and without experiencing leakage of the hydraulic fluid.

SUMMARY OF THE INVENTION

This invention arises from the realization that the leakage of the hydraulic fluid is caused in large part by the deformation of the walls of the cylinder in which the piston slides under the high-hydraulic pressure. This pressure may be between 10,000 and 20,000 pounds per square inch. The walls of the cylinder are thin and subject to deformation because of the necessity of providing a cylinder of sufficient volume to accommodate the slideable piston. It has also been realized that deformable membranes transmit pressure with little attenuation.

In accordance with this invention the piston and its neoprene seal are eliminated. In the practice of this invention, the high force required is provided by the deflection or deformation of a membrane under hydraulic pressure which deforms, but does not rupture under the pressure. A cavity is provided in an annulus or hydraulic nut. The cavity is sealed by a yieldable or deflectable or deformable membrane. The high force is applied through an annular shoe interposed between the membrane and the body to which the force is applied which backs up the membrane. When the membrane is deformed by hydraulic pressure, it applies the necessary force to the body through the shoe. A thin membrane composed of ductile material is required. It is necessary that the membrane deform under the applied pressure without rupturing or exerting a large counter-force on the pressurizing fluid.

This application refers to an "annular cavity." The reference to an annular cavity in this application is intended to include within its scope a plurality of cavities in the form of separate segments around the periphery of the annulus.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 1 is a view in side elevation with a part in section of an embodiment of this invention;

FIG. 2 is a view in end elevation, as seen from the direction of the shoe through which the hydraulic force is applied;

FIG. 3 is a view in section taken along line III—III of FIG. 2;

FIG. 4 is a view in end elevation of the hydraulic nut shown in FIG. 2 taken in direction IV—IV of FIG. 3;

FIGS. 7 and 8 are respectively a plan view and a view along line VIII—VIII of FIG. 7 of a diaphragm used in the practice of this invention;

FIG. 9 is a view in end elevation, as seen from the side of the hydraulic nut, of the shoe used in the practice of this invention;

FIG. 10 is a view in section taken along line X—X of FIG. 9 and also showing typical dimensions of this shoe; and FIG. 11 is a fragmental view enlarged of the portion of the shoe in Circle XI of FIG. 10 showing typical dimensions of this shoe.

DETAILED DESCRIPTION OF INVENTION

Figure 5:
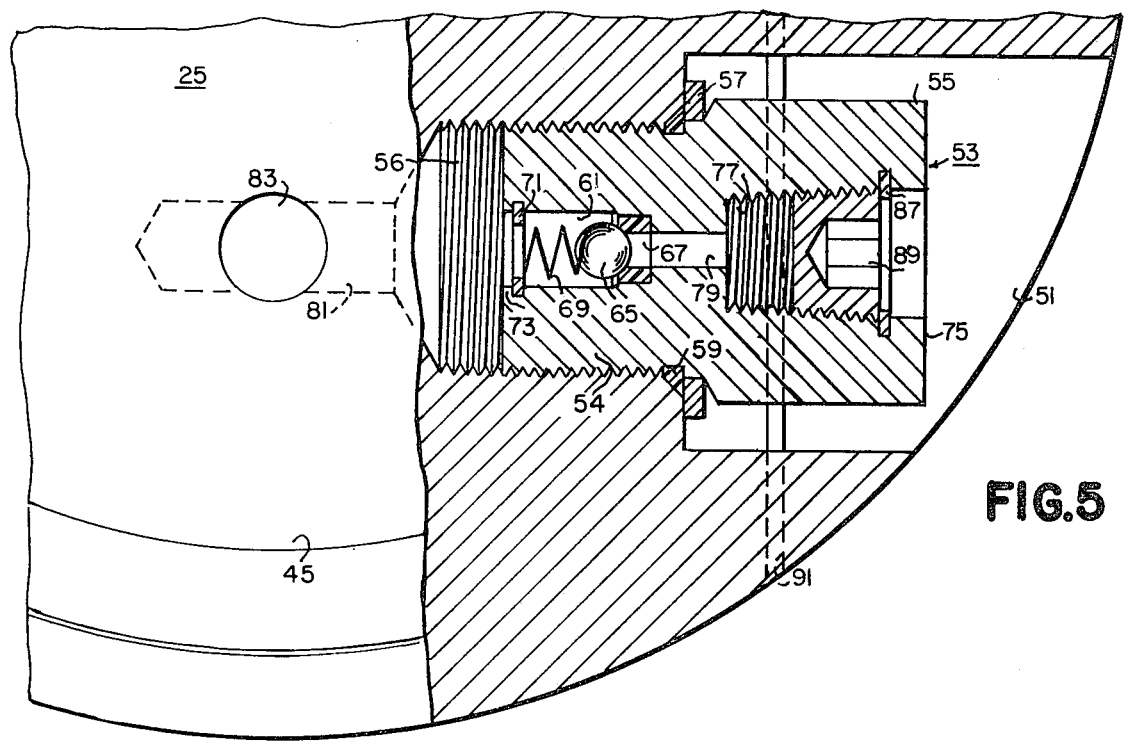
FIG. 5 is a fragmental view enlarged partly in section and partly in side elevation of the portion of FIG. 2 in Circle V showing the mechanism or port through which the hydraulic fluid is injected into the closed cavity.
Figure 6:
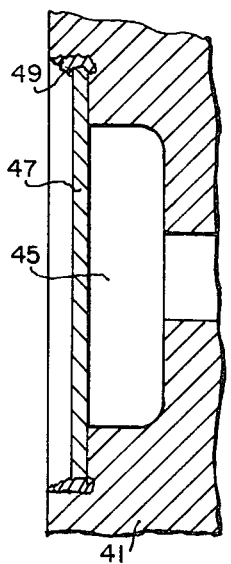
FIG. 6 is a fragmental view partly in section showing how the membrane is secured over the cavity in the hydraulic nut.

The apparatus shown in the drawings is an hydraulic-pressure unit 25 which includes an hydraulic nut 41 (FIGS. 2–4) and a shoe 43 (FIG. 1). The hydraulic nut 41 is an annulus having an annular groover or cavity 45. Internally, the nut 41 has a thread 46 which engages a cooperative thread on an arbor or like apparatus on which the body (not shown) to which the force is applied is mounted (see Purcupile application). As disclosed in Purcupile application for a typical hydraulic nut the material bounding this cavity 45 is of substantial thickness. The cavity 45 is closed by an annular membrane 47 which is sealed pressure tight to the annulus 41 about the cavity 45. As disclosed in Purcupile application for a typical membrane, 47, this membrane is thin and is deformable or deflectable. The annulus 41 and membrane 47 are both composed of the same material and are joined by a fusion weld. Advantageously A.I.S.I. 304 stainless steel having the following composition in weight percent may be used:

| C | - | .08 max |

| | | |
|---|---|---|
| Mn | - | 2.00 max |
| Cr | - | 18 to 20 |
| Ni | - | 8 to 12 |
| Si | - | 1.00 max |
| P | - | .045 |
| S | - | .03 max |
| Fe | - | Remainder |

The seal is produced by welding the membrane 47 to the cavity 45 with a fusion weld 49. The fusion weld may be produced by arc welding or electron-beam welding or with a laser. It has been found that with the membrane so welded to the annulus 41, a sound pressure-tight seal is produced. Other materials, for example 316 or 347 stainless steel and INCONAL alloy 718, can also advantageously be used for the nut 41 and membrane 47.

As disclosed in the leaflet entitled *High Temperature High Strength Nickel Base Alloys* of The International Nickel Company, Inc., 2nd Edition June 1968, Copyright 1964, INCONEL Alloy 718 has the following nominal chemical composition in weight percent.

| | |
|---|---|
| Carbon | 0.04 |
| Manganese | 0.20 |
| Silicon | 0.30 |
| Chromium | 18.6 |
| Molybdenum | 3.1 |
| Columbium | 5.0 |
| Iron | 18.5 |
| Titanium | 0.9 |
| Aluminum | 0.4 |
| Nickel | Balance |

The annulus 41 is provided with a cut-out ledge 51 in its periphery where an hydraulic-fluid injection mechanism or port 53 is mounted. This mechanism 53 includes a shouldered-body member 55 whose head 75 is hexagonal and whose stem 54 is threaded and screwed into a threaded opening 56 in the radial wall, generally tangentially to, the ledge 51. The shoulder of member 55 is engaged by a washer 57. In the stem just below the shoulder the threaded member has a slot. An O-ring 59 is inserted in this slot and is compressed between the washer and the member 55 when the member is screwed into the opening 56. The stem has a reentranted opening 61 (FIG. 5) within which there is a valve. The valve includes a ball 65, a seat 67 for the ball 65, a spring 69 for urging the ball 65 into pressure sealing engagement with the seat 67, and a washer 71 for retaining and compressing the spring 69 and the ball 65. The seat 67 is nested in the outer end of the opening 61. The washer 71 is seated on a ledge in opening 61 near the inner end of the opening 61 and is held by a lip 73 which is formed by crimping the outer boundary of the opening 61. The head 75 of the member 55 has a central threaded opening 77 which communicates with the reentrant opening 61, when the valve 63 is open, through a hole 79. The reentrant opening 61 is connected to the cavity 45 through the part of the opening 56 inwardly from the valve, through a hole 81 tangential to the annulus 41 and through a hole 83 at right angles to the hole 81 generally parallel to the axis of the annulus 41.

The opening 77 is sealed by a plug 85 which screws into the opening. The plug 85 is secured by a snap ring 87 which is held in a slot flush with the outer surface of the plug 85. Outwardly, the plug has a hexagonal hole 89 in which a wrench may be inserted to remove the plug. The fluid-injection mechanism is held by a pin (not shown) which passes through a hole 91 drilled through the body of the annulus 41 and off-center through the member 55. The pin is welded in place.

The hole 77 serves for insertion of a fitting (not shown) to inject hydraulic fluid into the cavity 45. For this purpose the plug 85 is removed and the fitting is screwed into hole 77. Advantageously this fluid may be a grease. This has the advantage that the fluid oozes out when there is a leak and does not create a hazard. When fluid under pressure is supplied to the fitting, the ball 65 is retracted from the seat 67 and the fluid flows into cavity 45 through the valve 63 and the holes 81 and 83. When the fluid in the cavity is at the desired pressure (10,000 to 20,000 psi typically), the supply of fluid is interrupted and valve 63 recloses. The fitting is removed from the opening 71 and the plug 85 is screwed in and locked by snap ring 87. The fusion weld 49 has been found to be strong enough to retain the hydraulic fluid under high pressure.

The ledge 51 extends across the thickness of the annulus 41 and the threaded opening 77 of the fluid-injection mechanism is intermediate the side walls of the annulus 41. This structure facilitates ready injection of the fluid.

Diametrically opposite the fluid-injection mechanism 53, the annulus 41 is provided with an opening 93 (FIGS. 2 and 3) for bleeding off air and fluid during assembly and disassembly. The opening 93 is threaded to receive a threaded plug 95 for closing the opening 93. The plug 95 has a head engaged by a snap ring 97 which is held in a groove in the annulus above the head. Internally, the head of plug 93 engages and compresses an O-ring 99 which is seated in a groove in the opening 93. The opening 93 is in communication with the cavity 45 through a hole 101 parallel to the axis of the annulus.

The shoe 43 is an annulus. Its inner diameter is such that it is a slip fit on an arbor on which the body subjected to the pressure is mounted. One face 103 of the annulus has a flat portion terminating peripherally in a chamfer and this flat portion is engaged by the membrane 47. The flat portion extends completely across the free surface, (the surface bounded by the solid portion of the annulus under the membrane) of the membrane 47 and supports the membrane. The other face 105 may be tapered to engage a tapered object to which force is applied. As pressure is applied to membrane 47, the resulting force is transmitted by the membrane and applied to shoe 43 and through it to the object. The geometry and composition (the ductility) of the membrane is such that the membrane transmits the pressure without rupturing. Near its outer periphery on the side of face 103 the shoe 43 has a circumferential groove in which a rubber ring 107 of square cross-section is seated. The ring 107 is compressed between the annulus 41 and the shoe 43 and prevents dust and other particles from penetrating between the membrane 47 and the surface 103.

Dimensions of a typical and 41 ad corresponding membrane 47 and shoe 43 are presented in Tables III, IV and V of Purcupile application. These dimensions are presented only for the purpose of aiding those skilled in the art in practicing this invention and not with any intention of in any way limiting this invention.

While a preferred embodiment of this invention has been disclosed herein, many modifications thereof are feasible. This invention is not to be restricted except insofar as is necessitated by the spirit of the prior art.

We claim:

1. Apparatus for applying pressure to an annular object generally parallel to the axis of said object, including an annular member having a cavity therein, a deformable membrane, of a material capable of withstanding high pressure, whose plane is generally perpendicular to the axis of said annular member closing said cavity and sealed by a weld to said member forming a pressure-tight enclosure for said cavity, means connected to said cavity for supplying a medium for producing pressure in said cavity to deform said membrane in a direction generally parallel to the axis of said member, and means having a surface engaging said membrane and supporting said membrane as it is deformed and actuable, on the deformation of said membrane, to transmit force generally in the direction of the axis of said member.

2. Apparatus according to claim 1 wherein the cavity is annular and the membrane is also annular and is sealed to the annulus over said cavity, and also wherein the shoe is an annulus having an annular surface engaging said membrane.

3. The apparatus of claim 1 wherein the annular surface of the shoe engages the membrane over at least the whole free surface of said membrane that is not contiguous to the solid portion of the member under the annulus.

4. The apparatus of claim 1 wherein the medium is grease.

5. The apparatus of claim 1 wherein the annular member and membrane are both composed of the same metal and the seal between the membrane and the member is a fusion weld.

6. The apparatus of claim 5 wherein the alloy is INCONEL Alloy 718 having the following nominal composition in weight percent:

| | |
|---|---|
| Carbon | 0.04 |
| Manganese | 0.20 |
| Silicon | 0.30 |
| Chromium | 18.6 |
| Molybdenum | 3.1 |
| Columbium | 5.0 |
| Iron | 18.5 |
| Titanium | 0.9 |
| Aluminum | 0.4 |
| Nickel | Balance |

7. The apparatus of claim 5 wherein the alloy has the following nominal composition in weight percent:

| | | |
|---|---|---|
| Carbon | - | .08 maximum |
| Manganese | - | 2.00 maximum |
| Chromium | - | 18 to 20 |
| Nickel | - | 8 to 12 |
| Silicon | - | 1.00 maximum |
| Phosphorous | - | .045 maximum |
| Sulfur | - | .03 maximum |
| Iron | - | Remainder |

* * * * *